Figure 2A:
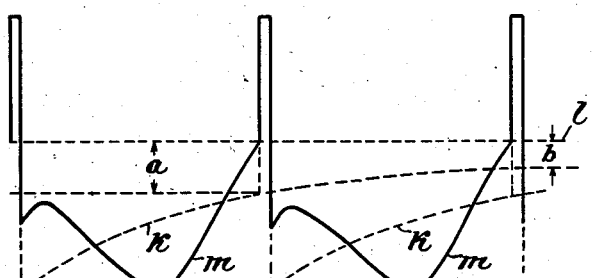

Aug. 11, 1942.   G. HEPP   2,292,835
ELECTRONIC GENERATOR
Filed Jan. 8, 1941   3 Sheets-Sheet 1
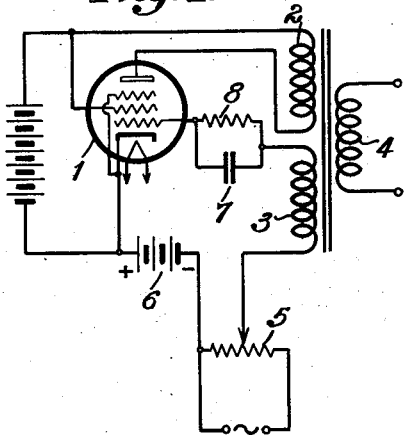
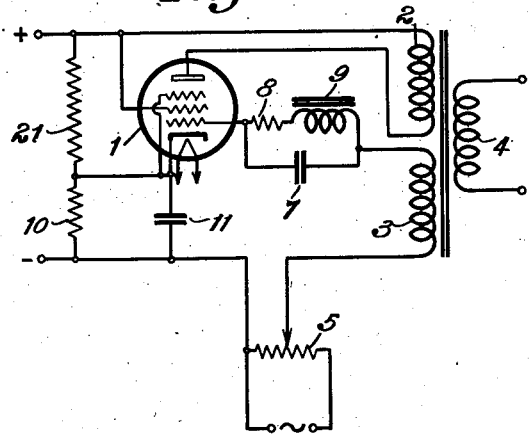
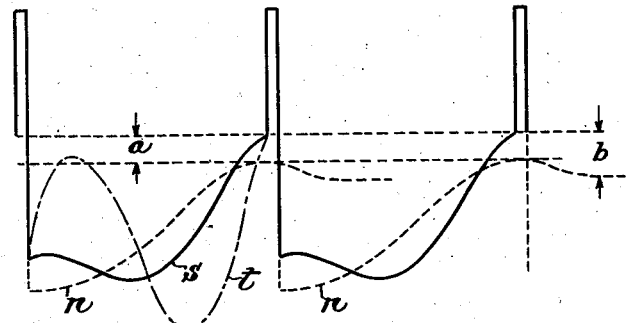
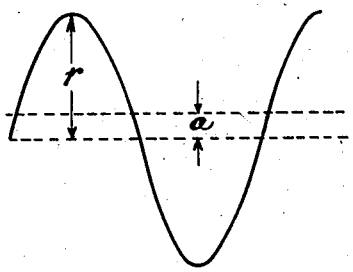
INVENTOR
*Gerard Hepp*
BY
*H. S. Grover*
ATTORNEY Aug. 11, 1942.   G. HEPP   2,292,835
ELECTRONIC GENERATOR
Filed Jan. 8, 1941   3 Sheets-Sheet 3

INVENTOR
Gerard Hepp
BY
H.S. Grover
ATTORNEY

Patented Aug. 11, 1942

2,292,835

UNITED STATES PATENT OFFICE 2,292,835

ELECTRONIC GENERATOR

Gerard Hepp, Eindhoven, Netherlands

Application January 8, 1941, Serial No. 373,585
In the Netherlands August 28, 1939

4 Claims. (Cl. 250—36)

This invention relates to electronic generators and, in particular, to blocking oscillators. Blocking oscillators incorporate an electron discharge device in which increasing anode current positively loads the grid, so that grid current starts to flow. The grid current charges a condenser in such manner that as soon as the anode current stops increasing, the grid becomes highly negative due to the condenser charge and blocks the tube until this charge is reduced to a sufficient extent to cause anode current to flow again and the action is repeated. Thus periodical short current pulses having steep, almost perpendicular wave fronts are set up which can be used for various purposes.

The device is free to oscillate and in this case the frequency will primarily be governed by the values of the blocking condenser and of the grid-resistor leak through which the charge of the condenser can discharge.

Frequently, however, it is desirable to cause such an oscillator to be in synchronism with a controlling sinusoidal oscillation. In this case difficulty arises and the invention has for its object to obviate this difficulty.

The difficulty encountered arises from the fact that the correct working is dependent to a substantial degree on the amplitude of the control voltage, since between a certain minimum value below which the oscillator will not operate and a value above which the device starts to operate correctly, there is a region in which the device will operate inefficiently or else in not intended manner due to instability. The improvement according to the invention causes this region to disappear. As soon as the amplitude of the control voltage consequently exceeds the minimum value, the oscillator starts at once to operate correctly.

According to the invention the circuit is so arranged that during the discharge period of at least one of the blocking condensers overdischarge temporarily occurs; that is to say, the circuit is somewhat under-damped so that not over substantially two complete oscillations occur.

According to the invention, use may be made for this purpose of one or more inductances added at suitable points of the circuit.

In order that the invention may be clearly understood and readily carried into effect it will now be described more fully with reference to the accompanying drawings, in which Fig. 1 is a diagram of a synchronized blocking oscillator without the use of the invention.

Figure 2B:
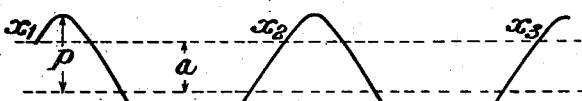

Figures 2a—2b show various graphs of the operation of a circuit as shown in Fig. 1.

Fig. 3 shows a circuit according to the invention.

Figures 4a—4c show the graphs associated with Fig. 3.

Figure 5:
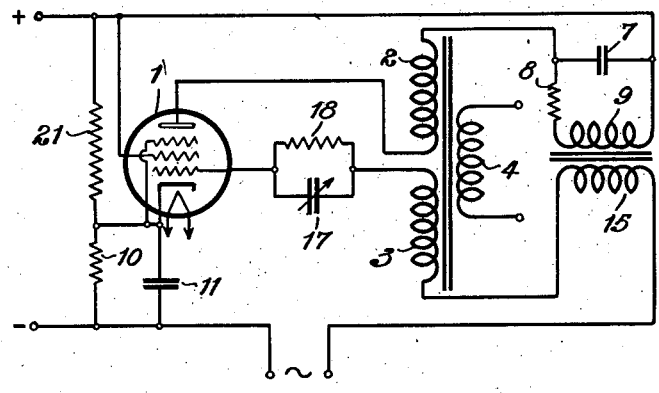
Figure 6:
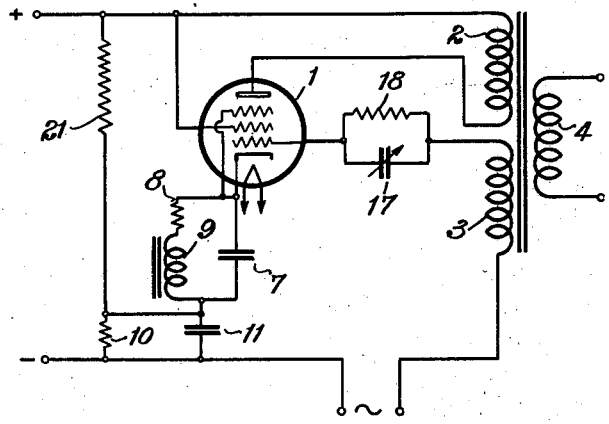
Figure 7:
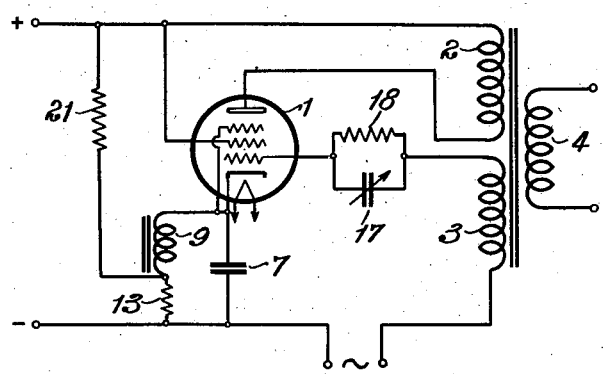

Figs. 5, 6 and 7 show other embodiments and modifications of the invention shown in Fig. 3.

Referring to Fig. 1, the anode circuit of an electron discharge tube 1 includes a winding 2 coupled to a winding 3 in the control grid circuit and also to the output winding 4. The control grid circuit also includes a potentiometer 5, from which a controllable fraction of the control voltage can be obtained, a bias battery 6 and a blocking condenser 7 shunted by a resistance 8.

The coils 2 and 3 are coupled in such manner that any increase of the anode current influences the control grid in a positive sense and conversely, a decrease causes a negative voltage on the grid. A current occurring in the anode circuit consequently increases very quickly up to the saturation value. In the case of a positive control grid, current passes through the resistance 8, and the condenser 7 will, therefore, be charged up, the negative side connected to the grid. As soon as the anode current has reached its maximum value the e. m. f. in the coil 3 ceases and the control grid is given a negative potential equal to the sum of the terminal voltages at the condenser 7 and the battery 6 so that the tube is suddenly blocked.

The charge of the condenser 7 then gradually discharges via the resistance 8 so that the grid potential increases again. However, the tube continues to be blocked until the control voltage is sufficiently high to break down the terminal voltage of the battery 6 and the residual voltage at the condenser 7, after which anode current starts again to flow so that the control grid becomes positive and so on.

In this case the terminal voltage of the battery 6 is frequently, although not necessarily, chosen so that in the absence of control voltage, the oscillator continues to be blocked and breakdown of the tube consequently only occurs on the arrival of positive control current pulses. For the purpose of satisfactory synchronization it is obviously necessary that for every positive control current impulse, one breakdown should occur. Now, in the device described this is found to be greatly dependent on the amplitude of the control currents, as will be set out in greater detail by reference to Figures 2a—2f.

In the graph 2a, the dotted curve k illustrates the variation of the discharge of the blocking condenser 7 if after a breakdown of the tube, the control voltage is absent. In this case, the control grid voltage approaches asymptotically to the value $-b$ calculated from the line of breakdown $l$, i. e., the line indicating the grid voltage at which breakdown occurs.

The graph 2b shows the variation of the control voltage made operative in the grid circuit of the tube 1. In the case shown this variation is sinusoidal as an example.

Now, in order that correct synchronization may ensue, if a breakdown occurs at the point $x_1$, such will also have to be the case at the points $x_2$, $x_3$ etc. which are spaced one wave length apart. The value of the control voltage at these points must equal $a$ for this purpose, as is shown by the variation of the curves $k$. The resulting grid voltage is represented in 2—a by the curve $m$ which intersects the line of breakdown $l$ periodically above $x_2$, $x_3$ etc.

Thus, it will be evident from Fig. 2a that the oscillator will not operate at all when the control voltage is absent or when half the amplitude of this voltage is smaller than $b$.

In addition, it is apparent therefrom that the said half-amplitude will have to be at least equal to $a$ if the oscillator is to be held in synchronism with the control voltage.

Figure 2C:
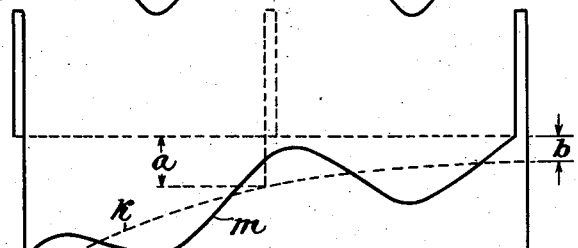
Figure 2D:
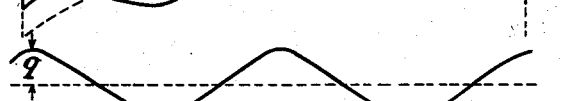

What happens if it is lower than $a$ but higher than $b$ is apparent from Figs. 2c and 2d. In these figures half the amplitude of the control voltage $q$ is chosen to be smaller than $a$ but larger than $b$ and the result is that only at every second voltage peak a breakdown will occur. In this case the oscillator consequently operates with half the frequency.

Figure 2E:
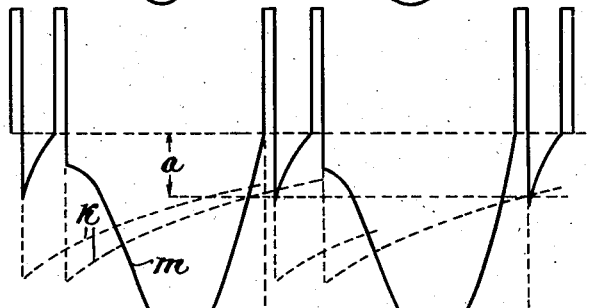
Figure 2F:
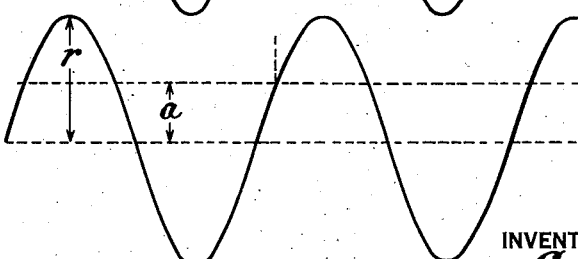

But even when the amplitude is chosen to be materially larger than $a$ difficulties arise, as is shown in Figures 2e and 2f. In these figures this amplitude $r$ is about double the value of $a$ and the result is that at each voltage peak two breakdowns ensue in quick sequence with one another, which, of course, is also not desirable.

Fig. 3 shows a form of construction of a circuit according to the invention which reduces the above-mentioned difficulties and reduces them to a marked extent.

The circuit is quite similar to that shown in Fig. 1 except for the replacement of the battery 6 by a cathode resistance 10 with smoothing condenser 11, and the addition of an inductance 9 in series with a resistance 8. The discharge of the condenser 7 is first delayed by this addition but is then accelerated in such manner that some overdischarge occurs towards the end. In this connection it may be observed that the presence of the smoothing condenser 11 increases the above-mentioned difficulty, because after each breakdown not only will the condenser 7 have a residual charge, but the charge 11 will also be increased. In proportioning the inductance, this factor should, therefore, be taken into account.

The form of the discharge curve and also its influence on the synchronization are shown in Figures 4a–4c. In the diagram 4a the curves $n$ represent the potential gradient between the condenser terminals during each discharge period. They first ascend slowly, then rapidly and approach the line of breakdown up to a distance $a$ in order next to recede therefrom to a distance $b$. Obviously, $a$ is consequently the minimum value for half the amplitude of the control voltage. As soon as the latter is but slightly reduced it is not possible any longer that any breakdown occurs. The dangerous zone $a$—$b$ discussed with reference to Figs. 1 and 2a–2f is consequently wholly eliminated.

Fig. 4b shows a control voltage having a half-amplitude $q$ and being similar to that of Fig. 2c. If the resulting potential curve $s$ of 4a is compared with $m$ of 2c, it is seen that in the former case this curve intersects the line of breakdown at each voltage peak, whereas such is the case in Fig. 2c only every second time.

Control voltages which consequently were too weak for well-known types of oscillators are sufficiently intense for the improved oscillator to avoid frequency-drift.

But even in the case of strong control voltages, the device offers improvement over the prior one, as may also appear from Fig. 4a in conjunction with 4c. In the latter, one wave is shown whose control voltage has a half-amplitude value $r$ which is equal to that of Fig. 2f. The resulting potential curve $t$ is denoted in Fig. 4a by a dash-dotted line. Due to the fact that the curve $n$ initially ascends but slowly, in contradistinction to the curves $k$ of Fig. 2, only one breakdown per voltage peak occurs.

It must be observed that the invention is useful even when it is desired to change the frequency of the control voltage. Due to this use, the operation of the circuit will become more stable since the component frequency will be less variable in the case of fluctuations in the amplitude of the control voltage.

The correct shape of the discharge curve will obviously depend on the choice of the dimensions. As an example, satisfactory results are obtained by means of a circuit as shown in Fig. 3 at the following values:

| | |
|---|---|
| Condenser 7 | .02 f. |
| Resistance 8 | 25,000 ohms |
| Inductance 9 | 7 henries |
| Control voltage | 4 v. virtual |
| Frequency | 4,000 cycles/sec. |
| Anode voltage | 185 volts |
| Resistance 10 | 2,600 ohms |
| Condenser 11 | 1 µf. |
| Tube type | Philips E¹ 3 |

The construction shown in Fig. 3 is only one of the many possibilities of realizing the inventive idea. A few examples of modified construction are shown in Figs. 5, 6 and 7. The added inductance is designated by the numeral 9 also in these circuits, the operation of which will be clear after the foregoing.

In Fig. 5 the blocking condenser 7 and its leak 8 and the added inductance 9 are not included in the grid circuit as is done in Figure 3 but in the anode circuit which is coupled to the grid circuit by the coils 9 and 16. Now, the variable condenser 17 with its shunting resistance 18 connected between the grid and coil 3 no longer serves primarily for blocking but for controlling the width of the pulses generated. This remark also applies to Figs. 6 and 7.

In Fig. 6 the circuit 7—8—9 is included in the cathode conductor of the tube in contradistinction to being connected between the grid and coil 3 of the circuit shown in Figure 3 and the condenser 7 is, therefore, charged not only by the grid but also by anode and control grid currents.

Fig. 7, a further modification of Figure 3, is a simplification of Fig. 6 in that the resistances 8 and 10 are assembled to form the resistance 13 and connected in the cathode lead of the tube with the smoothing condenser 11 being omitted.

Having described my invention, what I claim is:

1. A blocking grid oscillator comprising a thermionic tube having at least a cathode, control electrode and an anode, means to supply voltage to said anode, an inductive energy transfer circuit connected to said anode and between said control electrode and said cathode, a condenser having connected in parallel therewith a serially connected inductance and resistor connected in series with that portion of the transfer circuit connected between said control electrode and said cathode, means connected in series with said portion of the transfer circuit to supply control voltage to said cathode and control electrode, and inductive output means coupled to said transfer circuit and deriving output energy.

2. A blocking grid oscillator comprising a thermionic tube having at least a cathode, control electrode and an anode, means to supply voltage to said anode, an inductive energy transfer circuit connected to said anode and between said control electrode and said cathode, a condenser having connected in parallel therewith a serially connected inductance and resistor connected in series with that portion of the transfer circuit connected between said control electrode and said cathode, said inductance resistance and capacity having such values as to provide an under-damped oscillatory circuit, means connected in series with said portion of the transfer circuit to supply control voltage to said cathode and control electrode, and inductive output means coupled to said transfer circuit and deriving output energy.

3. A blocking grid oscillator comprising a thermionic tube having at least a cathode, control electrode and an anode, means to supply voltage to said anode, an inductive energy transfer circuit connected to said anode and between said control electrode and said cathode, a condenser having connected in parallel therewith a serially connected inductance and resistor connected in series with that portion of the transfer circuit connected between said control electrode and said cathode, said resistance inductance and capacity having such values that less than two oscillations take place upon excitation in said connected resistance inductance and capacity, means connected in series with said portions of the transfer circuit to supply control voltage to said cathode and control electrode, and inductive output means coupled to said transfer circuit and deriving output energy.

4. A blocking grid oscillator comprising a thermionic tube having at least a cathode, control electrode and an anode, means to supply voltage to said anode, an inductive energy transfer circuit connected to said anode and between said control electrode and said cathode, a condenser having connected in parallel therewith a serially connected inductance and resistor connected in series with that portion of the transfer circuit connected between said control electrode and said cathode, means connected in series with said portion of the transfer circuit to supply control voltage to said cathode and control electrode, and an impulse duration controlling circuit comprising a parallelly connected resistance and condenser connected between said control electrode and said transfer means.

GERARD HEPP.